United States Patent
Derks et al.

(10) Patent No.: US 9,895,837 B2
(45) Date of Patent: *Feb. 20, 2018

(54) TEXTURED FILM AND PROCESS FOR MANUFACTURE

(75) Inventors: Kristopher J. Derks, Woodbury, MA (US); James E. Lockridge, St. Paul, MN (US); Adam D. Haag, Woodbury, MN (US); Jeffrey A. Peterson, North St. Paul, MN (US); Michael J. Schiesl, Hutchinson, MN (US); Jeffrey W. Hagen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 765 days.

This patent is subject to a terminal disclaimer.

(21) Appl. No.: 14/342,566

(22) PCT Filed: Sep. 13, 2012

(86) PCT No.: PCT/US2012/055047
§ 371 (c)(1),
(2), (4) Date: Jun. 11, 2014

(87) PCT Pub. No.: WO2013/043447
PCT Pub. Date: Mar. 28, 2013

(65) Prior Publication Data
US 2014/0308477 A1   Oct. 16, 2014

Related U.S. Application Data

(60) Provisional application No. 61/536,732, filed on Sep. 20, 2011.

(51) Int. Cl.
B29C 55/02 (2006.01)
B32B 27/36 (2006.01)
(Continued)

(52) U.S. Cl.
CPC ............ B29C 55/023 (2013.01); B32B 27/36 (2013.01); G02B 5/00 (2013.01); G02B 5/3083 (2013.01);
(Continued)

(58) Field of Classification Search
None
See application file for complete search history.

(56) References Cited

U.S. PATENT DOCUMENTS 3,051,452 A   8/1962 Nobel
3,182,965 A   5/1965 Sluijters
(Continued)

FOREIGN PATENT DOCUMENTS

CN   102012536   4/2011
WO   WO 2008-133875   11/2008
(Continued)

OTHER PUBLICATIONS

Print Process Descriptions: Printing Industry Overview: Gravure; as published at http://www.pneac.org/printprocesses/gravure/ on Feb. 9, 2003, retrieved May 1, 2017.*

(Continued)

*Primary Examiner* — Michael P Rodriguez
(74) *Attorney, Agent, or Firm* — Gregg H. Rosenblatt

(57) ABSTRACT

A textured film, a process for manufacture of the textured film, and a light management stack, a backlight, and a display using the textured film are described. The textured film and process for manufacture thereof, include processes in which the surface texture of the optical film is controlled by incorporation of a patterned coating. The surface texture of a polymeric film, such as a polymeric optical film, is controlled by incorporation of the coating, that can fracture or deform upon stretching the film.

16 Claims, 8 Drawing Sheets

(51) Int. Cl.
*G02B 5/30* (2006.01)
*G02B 5/00* (2006.01)
*B05D 5/00* (2006.01)
*B32B 37/15* (2006.01)
*B32B 38/00* (2006.01)
*B29K 105/16* (2006.01)

(52) U.S. Cl.
CPC ............ *B05D 5/00* (2013.01); *B29K 2105/16* (2013.01); *B29K 2995/0097* (2013.01); *B32B 37/153* (2013.01); *B32B 2038/0028* (2013.01); *B32B 2250/05* (2013.01); *B32B 2250/244* (2013.01); *B32B 2250/42* (2013.01); *B32B 2307/40* (2013.01); *B32B 2457/20* (2013.01); *Y10T 428/24355* (2015.01)

(56) References Cited

U.S. PATENT DOCUMENTS

| | | | |
|---|---|---|---|
| 3,195,865 A | 7/1965 | Harder | |
| 3,687,589 A | 8/1972 | Schrenk | |
| 3,737,882 A | 6/1973 | Furuoya | |
| 3,773,882 A | 11/1973 | Schrenk | |
| 3,884,606 A | 5/1975 | Schrenk | |
| 5,094,788 A | 3/1992 | Schrenk | |
| 5,389,324 A | 2/1995 | Lewis | |
| 6,179,948 B1 | 1/2001 | Merrill | |
| 6,783,349 B2 | 8/2004 | Neavin | |
| 6,827,886 B2 | 12/2004 | Neavin | |
| 6,916,440 B2 | 7/2005 | Jackson | |
| 6,936,209 B2 | 8/2005 | Jackson | |
| 6,939,499 B2 | 9/2005 | Merrill | |
| 6,949,212 B2 | 9/2005 | Merrill | |
| 9,102,131 B2 * | 8/2015 | Derks | B23B 37/144 |
| 2001/0011779 A1 | 8/2001 | Stover | |
| 2003/0124291 A1 * | 7/2003 | Ausen | A61K 9/7023 428/40.1 |
| 2003/0214720 A1 | 11/2003 | Bourdelais et al. | |
| 2006/0084780 A1 | 4/2006 | Hebrink | |
| 2006/0226561 A1 | 10/2006 | Merrill | |
| 2007/0047080 A1 | 3/2007 | Stover | |
| 2008/0049419 A1 | 2/2008 | Ma | |
| 2008/0152837 A1 | 6/2008 | Chien | |

FOREIGN PATENT DOCUMENTS

| | | | |
|---|---|---|---|
| WO | WO 2011-119387 | 9/2011 | |
| WO | WO 2011119387 A2 * | 9/2011 | B32B 3/085 |

OTHER PUBLICATIONS

International Search Report for PCT Internation Application No. PCT/US2012/055047 dated Jan. 3, 2013 4 pages.

* cited by examiner

TEXTURED FILM AND PROCESS FOR MANUFACTURE

CROSS REFERENCE TO RELATED APPLICATIONS

This application is a national stage filing under 35 U.S.C. 371 of PCT/US2012/055047, filed Sep. 13, 2012, which claims priority to U.S. Provisional Application No. 61/536,732, filed Sep. 20, 2011, the disclosure of which is incorporated by reference in its/their entirety herein.

FIELD OF THE INVENTION

The present disclosure relates generally to a textured film and a process for manufacture thereof, and more particularly to processes in which the surface texture of a polymeric film is controlled by incorporation of a patterned coating.

BACKGROUND

Over the past several years the use of polymeric films to produce high-quality optical films has been explored. The investigated polymeric optical films typically exploit differing indices of refraction between layers of a multilayer film. For example, a multilayer optical film (MOF) may be constructed by alternating polymer layers having high indices of refraction with polymer layers having low indices of refraction. Where two adjacent layers are formed with a relatively large mismatch between the respective indices of refraction, light of a particular wavelength is reflected at the interface of the two layers. The wavelength of light reflected at the interface is dependent on the optical thickness of the adjacent layers. Optical films may also be made of polymeric blends exploiting relative refractive indices relationships of different phases of the blend.

One type of multilayer optical film uses birefringent polymers to produce the mismatch between adjacent indices of refraction. In such films, the multilayer film is drawn either uniaxially in a direction along only one in-plane axis of the film or biaxially in a direction along two in-plane orthogonal axes of the film. As a result of drawing, molecules within one of the two adjacent layers become oriented in the direction of the draw. The molecular orientation alters the index of refraction of the affected layer in the draw direction.

Drawing a multilayer film, where one of the layers of the film is birefringent, can be used to obtain a mismatch of refractive indices of two adjacent layers in the draw direction. If the refractive indices of the two layers in the non-drawn in-plane direction match, the multilayer film may be used to reflect light of one polarization and transmit light of another. Such a film may be employed, for example, as a reflective polarizer. If a multilayer film is drawn such that the affected layer is oriented in the direction of two orthogonal in-plane axes, a mismatch in both directions may be obtained. Such a film may be used to reflect light of both polarizations (for example, a mirror for the respective wavelength of light).

Multilayer films are typically used in conjunction with additional optical films to effect desired management of light within, for example, a display. The multilayer films can be coated with additional layers after processing, or laminated to other films, such as, for example, diffusers, to accomplish a desired control of light passing through or incident on the multilayer film.

SUMMARY

The present disclosure relates generally to a textured film and a process for manufacture thereof, and more particularly to processes in which the surface texture of the optical film is controlled by incorporation of a patterned coating. In one aspect, the present disclosure provides a textured film that includes a strain-hardened polymeric film having a first major surface; a first polymer layer disposed on the first major surface; and a second polymer layer disposed on the first polymer layer, the second polymer layer comprising a plurality of protruding regions, each of the protruding regions having a protruding thickness greater than a coated thickness adjacent the protruding regions, wherein a portion of a first thickness of the first polymer layer adhered to each of the protruding regions is greater than a second thickness of the first polymer layer between at least one adjacent protruding region.

In another aspect, the present disclosure provides a method of texturing a film that includes providing a multilayer film comprising a polymer film and a first polymer layer disposed on a first major surface of the polymer film; disposing a second polymer layer having a non-uniform thickness on the first polymer layer, opposite the polymer film; and stretching the multilayer film to form a plurality of protruding regions, each of the protruding regions adhered to the polymer layer, wherein a portion of a first thickness of the polymer layer adhered to each of the protruding regions is greater than a second thickness of the polymer layer between at least one adjacent protruding region.

In yet another aspect, the present disclosure provides a light management film stack that includes a textured film. The textured film includes a strain-hardened polymeric film having a first major surface; a first polymer layer disposed on the first major surface; and a second polymer layer disposed on the first polymer layer, the second polymer layer comprising a plurality of protruding regions, each of the protruding regions having a protruding thickness greater than a coated thickness adjacent the protruding regions, wherein a portion of a first thickness of the first polymer layer adhered to each of the protruding regions is greater than a second thickness of the first polymer layer between at least one adjacent protruding region.

In yet another aspect, the present disclosure provides a backlight that includes a textured film. The textured film includes a strain-hardened polymeric film having a first major surface; a first polymer layer disposed on the first major surface; and a second polymer layer disposed on the first polymer layer, the second polymer layer comprising a plurality of protruding regions, each of the protruding regions having a protruding thickness greater than a coated thickness adjacent the protruding regions, wherein a portion of a first thickness of the first polymer layer adhered to each of the protruding regions is greater than a second thickness of the first polymer layer between at least one adjacent protruding region.

In yet another aspect, the present disclosure provides a display that includes a textured film. The textured film includes a strain-hardened polymeric film having a first major surface; a first polymer layer disposed on the first major surface; and a second polymer layer disposed on the first polymer layer, the second polymer layer comprising a plurality of protruding regions, each of the protruding regions having a protruding thickness greater than a coated thickness adjacent the protruding regions, wherein a portion of a first thickness of the first polymer layer adhered to each of the protruding regions is greater than a second thickness of the first polymer layer between at least one adjacent protruding region.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure describes some unique mechanisms to create amplified surface features in polymeric film surface layers, such as polymeric multilayer film surface layers including, for example, skin layers. It has been discovered that coatings that are applied before orientation (that is, before stretching) of a polymeric film can subsequently fracture or otherwise form a texture during stretching. Such textured coatings can have an effect of locally "reinforcing" the skin of the multilayer film, amplifying the effect in surface roughness or texturing of the coating thickness in the finished film. The amplified surface roughness can be imposed without typically affecting the remainder of the multilayer film. This enables much greater surface relief and a light bending surface area, which can be important in optical films.

One such type of coating and technique for preparing a film having a texture has been described, for example, in U.S. patent application Ser. No. 61/317,945 entitled "TEXTURED FILM AND PROCESS FOR MANUFACTURE THEREOF", filed on Mar. 26, 2010. In one particular embodiment described therein, a textured film can be prepared by fracturing a uniform coating disposed on the film during stretching the film. It has now been discovered that a textured film can instead be prepared by imposing some structure on the film prior to stretching, by one of several patterning techniques that can promote cracking and texture formation. Several suitable patterning techniques can be used including, for example, printing a pattern such as by inkjet or gravure roll, embossing a pattern such as by an embossing roll, scribing a pattern such as by laser or mechanical ablation, and the like.

Various process considerations are important in making high quality polymeric films, polymeric multilayer films, polymeric multilayer optical films, and other optical devices in accordance with the present invention. Such films include, but are not limited to, optical films such as interference polarizers, mirrors, colored films, and combinations thereof. The films are optically effective over diverse portions of the ultraviolet, visible, and infrared spectra. Of particular interest are coextruded polymeric multilayer optical films having one or more layers that are birefringent in nature. The process conditions used to make each depends in part on (1) the particular resin system used and (2) the desired optical properties of the final film. In one particular embodiment, such polymeric multilayer optical films include, for example, Vikuiti™ Dual Brightness Enhancing Film (DBEF), Vikuiti™ Advanced Polarizing Film (APF), and Vikuiti™ Enhanced Specular Reflective (ESR) Film, all available from 3M Company.

Figure 1:
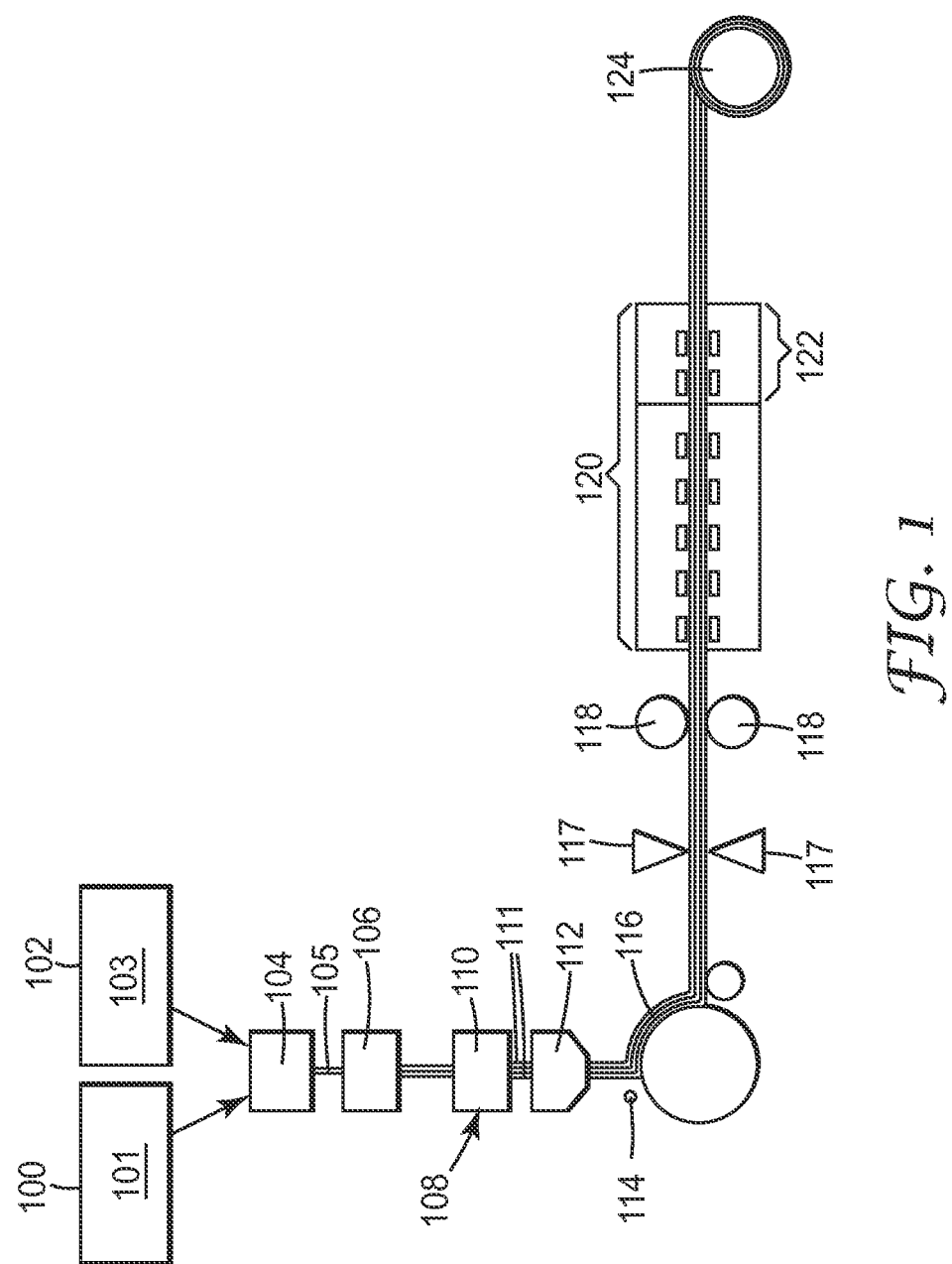
FIG. 1 is a schematic of a multilayer film process.

FIG. 1 shows a process of making a multilayer film such as a multilayer optical film described, for example, in U.S. Pat. No. 6,783,349 (Neavin et al.), which has been modified to make a textured film of the present disclosure, as described below. Materials 100 and 102, selected to have suitably different optical properties, are heated above their melting and/or glass transition temperatures and fed into a multilayer feedblock 104. Typically, melting and initial feeding is accomplished using an extruder for each material. For example, material 100 can be fed into an extruder 101 while material 102 can be fed into an extruder 103. Exiting from the feedblock 104 is a multilayer flow stream 105. A layer multiplier 106 splits the multilayer flow stream, and then redirects and "stacks" one stream atop the second to multiply the number of layers extruded. An asymmetric multiplier, when used with extrusion equipment that introduces layer thickness deviations throughout the stack, may broaden the distribution of layer thicknesses so as to enable the multilayer film to have layer pairs corresponding to a desired portion of the visible spectrum of light, and provide a desired layer thickness gradient. If desired, skin layers 111 may be introduced into the multilayer optical film by feeding resin 108 (for skin layers) to a skin layer feedblock 110.

The multilayer feedblock feeds a film extrusion die 112. Examples of feedblocks are described in, for example, U.S. Pat. No. 3,773,882 (Schrenk) and U.S. Pat. No. 3,884,606 (Schrenk). As an example, the extrusion temperature may be approximately 295 degrees C. and the feed rate approximately 10-150 kg/hour for each material. It is desirable in most cases to have skin layers 111 flowing on the upper and lower surfaces of the film as it goes through the feedblock and die. These layers serve to dissipate the large stress gradient found near the wall, leading to smoother extrusion of the optical layers. Typical extrusion rates for each skin layer would be 2-50 kg/hr (1-40% of the total throughput). The skin material can be the same material as one of the optical layers or be a different material. An extrudate leaving the die is typically in a melt form.

The extrudate is cooled on a casting wheel 116, which rotates past pinning wire 114. The pinning wire pins the extrudate to the casting wheel. To achieve a clear film over a broad range of angles, one can make the film thicker by running the casting wheel at a slow speed, which moves the reflecting band towards longer wavelengths.

A texturable coating can be applied using a pattern coating station 117, to either one or both of the major surfaces of the multilayer film. The pattern coating station 117 can include any known technique for coating a polymer web including, for example, knife coating, slot coating, slot fed knife coating, curtain coating, gravure coating, mayer rod coating, and the like; as well as any known technique for forming a pattern in the coating including, for example, spray coating, gravure printing, ink-jet printing, embossing, mechanical scribing, laser scribing, and the like. The texturable coating can be applied in a solvent based coating, from a melted coating, or from a 100% solids coating, such as a radiation curable coating. In some cases, a texturable coating can arise from coating a particulate-loaded polymeric material that can form agglomerates of particles upon drying. The texturable coating can then be dried, cooled, or cured to the major surface(s), by any known technique.

The multilayer film can then be oriented by stretching at ratios determined by the desired optical and mechanical properties. Longitudinal stretching can be done by pull rolls 118. Transverse stretching can be done in a tenter oven 120. If desired, the film can be bi-axially stretched simultaneously. Stretch ratios of approximately 3-4 to 1 are preferred, although ratios as small as 2 to 1 and as large as 9 to 1 may also be appropriate for a given film. In one particular embodiment, a higher draw ratio and the required higher draw temps for the strain hardening layer to orient appropriately without breaking might allow stretching such that a skin that would normally orient at a lower draw ratio may not orient at higher draw ratios. This may come at a cost to haze/clarity because the coating regions would be much more separated.

Stretch temperatures will depend on the type of birefringent polymer used, but 2 to 33 degrees C. (5 to 60 degrees F.) above its glass transition temperature would generally be an appropriate range. In some cases, particularly for olefins, the stretch temperature can range up to, but not exceeding, the melt temperature. The film can be heat set in the last two zones 122 of the tenter oven to impart the maximum crystallinity in the film and reduce its shrinkage. Employing a heat set temperature as high as possible without causing film breakage in the tenter can reduce the shrinkage during an optional heat conditioning step. A reduction in the width of the tenter rails by about 1-4% also serves to reduce film shrinkage. If the film is not heat set, heat shrink properties are maximized, which may be desirable in some security packaging applications. The film can be collected on windup roll 124.

In some applications, it may be desirable to use more than two different polymers in the optical layers of the multilayer film. In such a case, additional resin streams can be fed using similar means to resin streams 100 and 102. A feedblock appropriate for distributing more than two layer types analogous to the feedblock 104 could be used.

The process used for making coextruded polymeric multilayer films, such as polymeric multilayer optical films of the present invention, will vary depending on the resin materials selected and the optical properties desired in the finished film product.

Moisture sensitive resins should be dried before or during extrusion to prevent degradation. The drying can be done by any means known in the art. One well-known means employs ovens or more sophisticated heated vacuum and/or desiccant hopper-dryers to dry resin prior to its being fed to an extruder. Another means employs a vacuum-vented twin-screw extruder to remove moisture from the resin while it is being extruded. Drying time and temperature should be limited to prevent thermal degradation or sticking during hopper-dryer or oven drying. In addition, resins coextruded with moisture sensitive resins should be dried to prevent damage to the moisture sensitive coextruded resin from moisture carried by the other resin.

Extrusion conditions are chosen to adequately feed, melt, mix and pump the polymer resin feed streams in a continuous and stable manner. Final melt stream temperatures are chosen within a range which avoids freezing, crystallization or unduly high pressure drops at the low end of the temperature range and which avoids degradation at the high end of the temperature range.

It is often preferable for all polymers entering the multilayer feedblock to be at the same or very similar melt temperatures. This may require process compromise if two polymers, whose ideal melt processing temperatures do not match, are to be coextruded.

Following extrusion, the melt streams are then filtered to remove undesirable particles and gels. Primary and secondary filters known in the art of polyester film manufacture may be used, with mesh sizes in the 1-30 micrometer range. While the prior art indicates the importance of such filtration to film cleanliness and surface properties, its significance in the present invention extends to layer uniformity as well. Each melt stream is then conveyed through a neck tube into a gear pump used to regulate the continuous and uniform rate of polymer flow. A static mixing unit may be placed at the end of the neck tube carrying the melt from the gear pump into the multilayer feedblock, in order to ensure uniform melt stream temperature. The entire melt stream is heated as uniformly as possible to ensure both uniform flow and minimal degradation during processing.

Multilayer feedblocks are designed to divide two or more polymer melt streams into many layers each, interleave these layers, and merge the many layers of two or more polymers into a single multilayer stream. The layers from any given melt stream are created by sequentially bleeding off part of the stream from a flow channel into side channel tubes that feed layer slots for the individual layers in the feedblock. Many designs are possible, including those disclosed in U.S. Pat. Nos. 3,737,882; 3,884,606; and 3,687,589 to Schrenk et al. Methods have also been described to introduce a layer thickness gradient by controlling layer flow as described in U.S. Pat. Nos. 3,195,865; 3,182,965; 3,051,452; 3,687,589 and 5,094,788 to Schrenk et al, and in U.S. Pat. No. 5,389,324 to Lewis et al. In typical industrial processes, layer flow is generally controlled by choices made in machining the shape and physical dimensions of the individual side channel tubes and layer slots.

Biaxial orientation or crossed uniaxial orientation of at least some of the materials can also enhance dimensional stability, including thermal and hygroscopic expansion as well as shrinkage. Dimensional stability is often important in end use applications, for example in liquid crystal displays. Constraints on in-plane expansion, for example, can lead to out-of-plane warping or buckling that leads to diminished or lost utility of the display. A biaxially oriented film in accordance with one embodiment of the present invention greatly reduces or eliminates this problem. It should also be noted that the directional characteristics of the various mechanical properties can be varied. For example, the direction of maximum tear resistance or maximum thermal expansion may be coincident or perpendicular to the final draw direction. In some cases, material selection and processing may be chosen to tailor these directions and magnitudes, for example by control of the composition and relative thicknesses of skin layers (and internal protective boundary layers of multilayer films) as well as by control of the orientation of the optical materials.

Improved mechanical properties may be imparted to an optical film by imparting biaxial characteristics to non-optical materials in the film (for example, protective boundary layers, skin layers, facilitating layers, and the like). For example, a multilayer construction may be fabricated in which the alternating layers include a first birefringent material and a second non-birefringent isotropic material. The film may also include one or more orient-able protective boundary or skin layers. Such a film may be processed with respect to a first direction under conditions which do not induce optical orientation in the first material of the optical layers but do orient the non-optical material in the direction of the first draw. The film may then be processed with respect to a second direction under conditions which orient the birefringent material of the optical layers and the non-optical material. The resulting film has adjacent layers of a uniaxial optically oriented birefringent material and an isotropic material forming the optical portion of the film and at least one biaxially oriented non-optical layer (for example, protective boundary layers or skin layers).

A common challenge with multilayer films is the need for a surface which has a coefficient of friction (COF) and surface morphology conducive to winding rolls of the material. In some cases, a pre-mask can be applied to the film after stretching and before winding. In some cases, outer skin materials containing particles, immiscible phases, or a pre-stretching or post stretching coating containing slip particles can be used. These techniques of ensuring adequate winding performance can add complexity and significant cost to the film.

In one particular embodiment, coating the web pre-stretching allows the coating to thin out and expose particles which can lower COF. This can enable a low enough COF to wind rolls of sufficient quality, provided air can be removed between successive wound layers. Representative techniques for ensuring the removal of air include edge knurling and/or pack winding. However, edge knurling can cause losses in film yield, as the edge knurls must be removed from the multilayered film product. Pack winding can lead to other roll winding defects, as known in the art. Typically, several microns of relief or protrusions are needed in order to accommodate air when winding rolls. Typical pre-stretching coatings can be as thick as several microns; however, the coatings thin by the draw ratio if compliant and non-fracturing. Coating pre-stretching matte coatings can also suffer reduced surface area coverage as the particulates or phases which create a matte surface can spread and separate, leaving non-matte regions on the surface of the film.

In some cases, beads commonly used for slip coatings are sized so that the post stretching coating thickness is no less than the radius of the bead, in order to get adequate anchoring. This means that most pre-stretching slip coatings must use sub micron beads in order to get adequate anchoring. In contrast, textured coatings can retain most of their pre-stretching thickness, thus substantially larger beads can be utilized. The amount of stretching of coating before texturing can also be tailored to meet the bead and/or surface topography of the skin that is desired. In addition, there is evidence that bead loading and interfaces can assist in fracture mechanics or texturing of matte coatings, that is more numerous the beads, the higher the number of fracture events resulting in higher haze and lower clarity.

In one particular embodiment, the interaction of textured coating remnants with multilayer film skin layers of the present disclosure can enable approximately 3× the surface area of matte as the skins create valleys adjacent to the remnants of the of the textured coating area. The added coverage of matte area can provide surface and optical characteristics similar to that attained with a post stretching coating step. In contrast, post stretching coating is often costly and complicated. In one particular embodiment, pre-stretching coating can also result in fewer coating defects compared to post stretching coating, as texturable coatings spread and randomize to hide or mute any pre-stretching coating defects. In one particular embodiment, the textured coatings are not mainly bulk scattering and related to surface unevenness, the multilayer film can be coated or laminated and nearly all light scattering events can be eliminated.

Figure 2A:
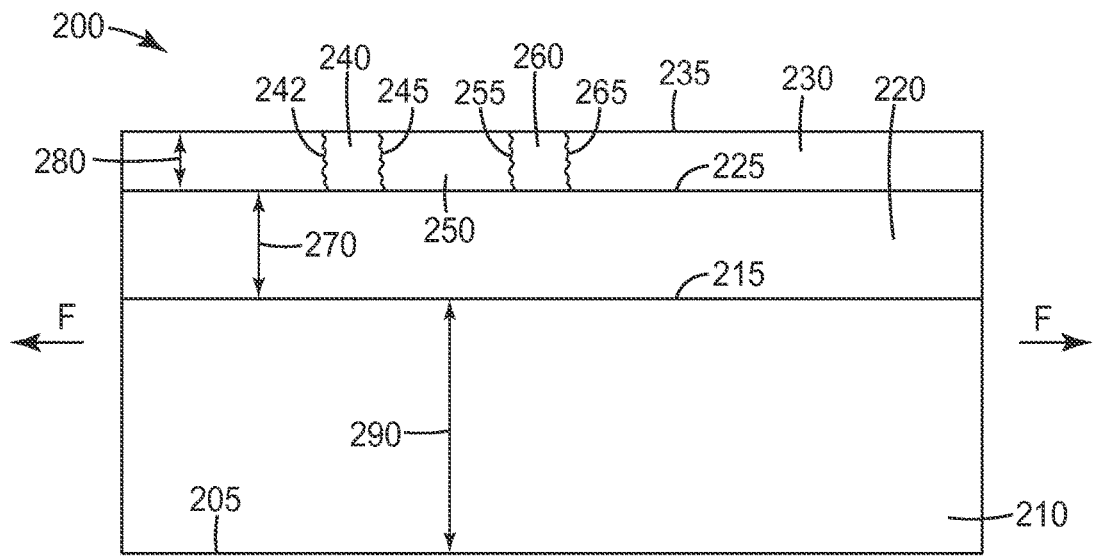
FIG. 2A is a cross-sectional schematic of a polymeric multilayer film.

FIG. 2A is a cross-sectional schematic of a polymeric multilayer film such as an optical film 200 according to one aspect of the disclosure. Optical film 200 includes a polymeric film 210 having a first major surface 215, a second major surface 205, and a first polymeric film thickness 290. In one particular embodiment, polymeric film 210 is a multilayer optical film, as described elsewhere. A first polymer layer 220 (that is, a skin layer) is disposed on the first major surface 215 to a polymer layer thickness 270. A second polymer layer 230 having a coated thickness 280 is disposed on the first polymer layer 220 to form an interface 225 between the first polymer layer 220 and the second polymer layer 230, and a free surface 235. A stretching force "F" is shown to be applied to the plane of the optical film 200.

In one particular embodiment, each of the layers in optical film 200 is comprised of a material that responds in a different manner to applied stress resulting from the stretching force "F". In some cases, the polymeric film 210 is a polymer layer that strain hardens upon application of the stretching force "F", and as such, the first polymeric film thickness 290 uniformly decreases as the optical film 200 stretches. The first polymer layer 220 is a polymer layer that either does not strain harden (that is, remains essentially amorphous), or strain hardens to a lesser degree than polymeric film 210, or even only slightly, upon application of the stretching force "F", and as such, the first polymer layer thickness 270 non-uniformly decreases as the optical film 200 stretches. First polymer layer 220 typically "thins down" non-uniformly, a behavior of stretching a generally non-strain-hardenable polymer film that is well known in the art.

Materials can be chosen such that the first polymer layer 220 has a Tg lower than the strain hardening layers in 210, or has elements of composition which hinder molecular orientation and alignment. By lowering the Tg of the skin such that under typical film stretching conditions, the polymer "motion" can tend to be great enough that it does not form order. In some cases, this can be done by judicious choice of input skin materials, or it can be done by altering current skin materials using monomers such as hexanediol to lower the Tg of a copolyester. In some cases, materials that can tend to behave as plasticizers or hinder crystal formation, or even molecular segments in the polymer which hinder crystal formation, can be added to the skin layer to effectively lower the Tg. In some cases, utilizing polymers or polymer blends with appropriate monomeric compositions such that even though they exhibit a Tg similar to the oriented materials, the polymer morphology is sufficiently retarded such that no "useful" order or crystallization is observed upon melt quenching or orientation.

In some cases, for example, copolyesters can include modified glycols or modified diacid (or diesters) for the purpose of retarding morphology changes and substantially reducing rates of strain-induced crystallization. Morphological modifiers can be selected from, for example, a modified glycol, a di-acid, a di-ester, or a combination thereof. Representative monomeric modifiers include, for example, neopentyl glycol (NPG) (available from Eastman Chemical Corp, Kingsport, Tenn.), cyclohexanedimethanol (CHDM) (available from Eastman Chemical Corp, Kingsport, Tenn.), dimethyl 5-sodiumsulfoisopthhalate (DMSSIP) (available from DuPont, Wilmington, Del.), sodiumsulfoisophthlaic acid (SSIPA), isophthalic acid (IPA) (available from BP Amoco, Naperville, Ill.), and the like, or combinations thereof.

In some cases, co-monomers such as, for example, hexanediol (available from BASF, Florham Park, N.J.) or dimethyl cyclohexyldicarboxylate (available from Eastman Chem Corp, Kingsport, Tenn.) can be introduced to suppress Tg, which may also be a significant factor in reducing the tendency to strain harden the layer at a given stretching temperature.

Additives which may retard orientation can include, for example, antistats, UV absorbers, oligomeric polyesters, optical brighteners and the like. Such additives can be generally thermally stable, low MW species which are compatible with the polymer. Exemplary material additives may include, for example, Tinuvin 1577—a triazine ultraviolet absorber (available from Ciba, Tarrytown, N.J.); THTs (UVA/HALS combo) such as Cyasorb THT6435 (available from Cytec, Woodland Park, N.J.); Optical Brighteners (e.g Eastobrite OB-1, Eastman, Kingsport, Tenn.); and the like; and combinations thereof.

As used herein, a "strain hardenable material" generally means a material that either crystallizes, or changes state of crystallinity, as it stretches. Typically, such materials can exhibit a birefringence of greater than about 0.05 after stretching at an appropriate processing temperature. In some cases, the strain hardenable material can be described in terms of % crystallinity and/or melting peak size and shape as measured, for example, by differential scanning calorimetry (DSC), as known to one skilled in the art. Also as used herein, a "substantially amorphous" material generally means a material that is capable of exhibiting birefringence less than about 0.05 after stretching at the processing temperature. Further, as used herein, a "fracturable material" generally means a material that is not capable of being stretched to the same extent as the other layers in the optical film 200, and thus, beyond the material's % elongation capability (at the processing temperature), it therefore undergoes fracture.

In one particular embodiment, a plurality of coating non-uniformities, or "cracks", can be formed in the second polymer layer 230 by several techniques including, for example, mechanical scribing, laser scribing, or embossing. Generally, cracks may be formed randomly across the free surface 235 of the second polymer layer 230. In some cases, cracks may be initiated at desired positions by externally imparting some feature, for example, scratches, impressions, and the like, to the free surface 235 prior to stretching, such that second polymer layer 230 becomes a second polymer layer 230 having a non-uniform thickness. In one particular embodiment, FIG. 2A shows a first crack 242, a second crack 245, a third crack 255, and a fourth crack 265, forming a first region 240, a second region 250, and a third region 260, in the second polymer layer 230. Cracks can be distributed in any fashion across the surface of the second polymer layer 230. In some cases, cracks can form the boundaries of "islands" which can range in diameter from about a few hundreds of nanometers to about a few hundreds of microns. In some cases, cracks can form the boundaries of "stripes" which can also range in width from about a few hundreds of nanometers to about a few hundreds of microns.

Figure 2B:
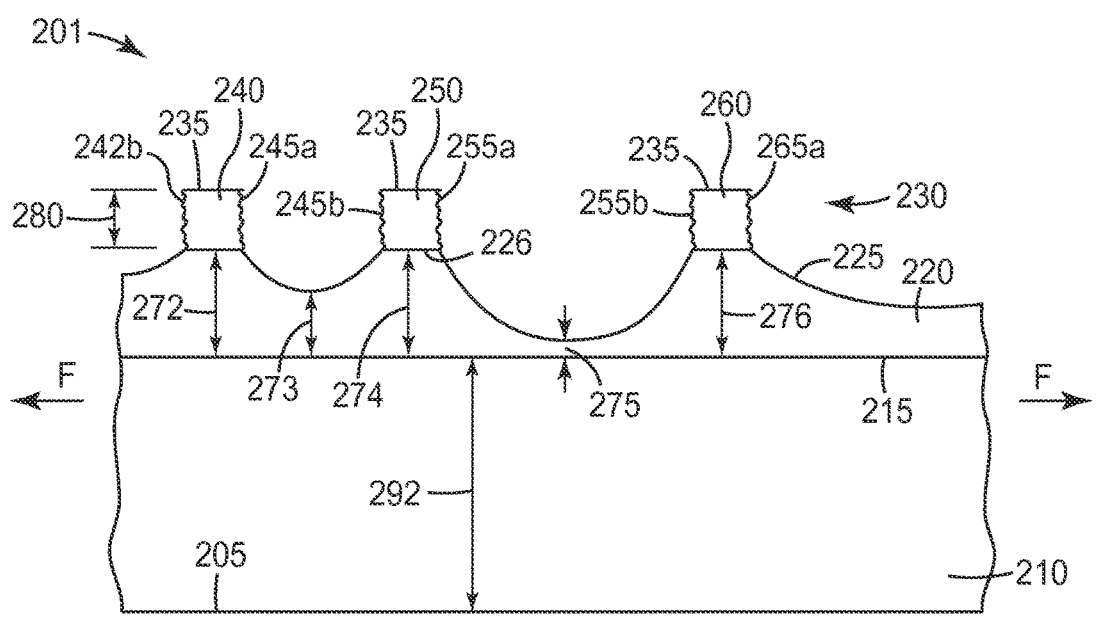
FIG. 2B is a cross-sectional schematic of a textured film.

FIG. 2B is a cross-sectional schematic of a polymeric multilayer film such as an optical film 201 according to one aspect of the disclosure. Optical film 201 can be a textured film 201 that includes a polymeric film 210 having a first major surface 215, a second major surface 205, and a first polymeric film thickness 292, as described elsewhere. Each of the elements 205-290 shown in FIG. 2B correspond to like-numbered elements 205-290 shown in FIG. 2A, which have been described previously. Each of the first region 240, second region 250, and third region 260 have become separated from each other to become first, second, and third protrusions, respectively, after stretching the optical film 200 shown in FIG. 2A to the extent shown in FIG. 2B. In particular, first crack 242 has widened to create two first crack surfaces 242a (not shown) and 242b; second crack 245 has widened to create two second crack surfaces 245a, 245b; third crack 255 has widened to create two third crack surfaces 255a, 255b; and fourth crack 265 has widened to create two third crack surfaces 265a, 265b (not shown).

As the optical film 201 stretches, each of the film layers experiences forces that, due to the nature of the materials in each film layer, results in different changes to each layer. For example, the polymeric film 210 comprises a material which can strain-harden upon application of the stretching force "F". Such a strain-hardening film uniformly decreases in a thickness 292 as the film stretches. The first polymer layer 220 comprises a material which does not strain harden upon application of the stretching force "F". Such a generally non strain-hardening layer tends to decrease thickness in a non-uniform manner, that is, "thins down" selectively as the layer stretches. This thinning down of the film is well known. Finally, in the positions where the first polymer layer 220 has a texturable coating adhered to the surface 226, the layer may not thin down, and the first polymer layer 220 can be considered to be "reinforced" by the texturable coating. Strain hardening or non-strain hardening behavior of a material can depend on a variety of processing conditions, such as, for example, the temperature at which the stretching is performed relative to the glass-transition temperatures (Tg) of each of the materials and the rate at which the stretching is performed. The strain hardening behavior can also depend on the sequence of stretching, such as, for example sequential or concurrent uniaxial or biaxial stretching; or true uniaxial stretching, that is, relaxation in a direction perpendicular to the draw direction and standard cross web stretch only without length orientation. True uniaxial stretching, or "parabolic" stretching, has been described, for example, in U.S. Pat. No. 6,939,499 (Merrill et al.); U.S. Pat. No. 6,916,440 (Jackson et al.); U.S. Pat. No. 6,949,212 (Merrill et al.); and U.S. Pat. No. 6,936,209 (Jackson et al.).

The thickness of the first polymer layer 220 varies across the first major surface 215 of the stretched film, creating the first major surface 215 texture. For example, a first thickness 272 under first region 240 may be different from a second thickness 274 under second region 250, and also different from a third thickness 276 under third region 260. However, in some cases, at least two of the first, second and third thicknesses 272, 274, 276 may be essentially the same, or they may be different. The thickness of the first polymer layer 220 between adjacent regions decreases by the thinning down of this layer, and as such, a fourth thickness 273 and a fifth thickness 275 can be generally less than any of the first, second or third thicknesses 272, 274, 276, respectively. In one particular embodiment, the difference in thickness of the first polymer layer 220 across the first major surface 215 can be, for example, greater than about 0.1 microns, or greater than about 0.5 microns, or greater than about 1 micron, or greater than about 3 microns, or even greater than about 5 microns. In some cases, the difference in thickness of the first polymer layer 220 across the first major surface 215 can be essentially the coated thickness 270 of the first polymer layer 220 as shown in FIG. 2A, that is, the thickness can be reduced to near zero in some portions of the first polymer layer 220.

Figure 2C:
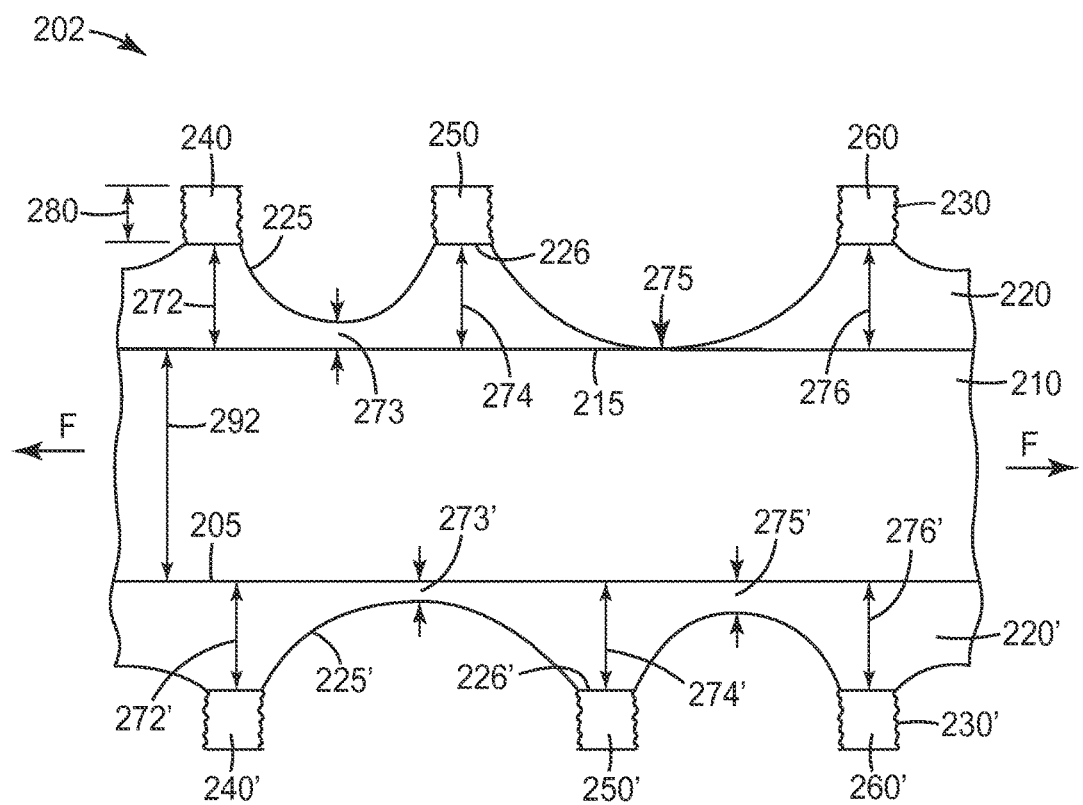
FIG. 2C is a cross-sectional schematic of a textured film.

FIG. 2C is a cross-sectional schematic of a polymeric multilayer film such as an optical film 202 according to one aspect of the disclosure. Optical film 202 can be a two-sided textured film 202 that includes a polymeric film 210 having a first major surface 215, a second major surface 205, and a first polymeric film thickness 292, as described elsewhere. Each of the elements 205-292 shown in FIG. 2C correspond to like-numbered elements 205-292 shown in FIG. 2B, which have been described previously. In FIG. 2C, a third polymer layer 220' is coated on the second major surface 205, and a fourth polymer layer 230' is disposed on the third polymer layer 220'.

In some cases, for example, as shown in FIG. 2C, the thickness of the first polymer layer 220 under selected protrusion regions can decrease as the film is stretched. For example, the second thickness 274 is shown to be less than first thickness 272 and third thickness 276, indicating that as the film is stretched, some of the material under the second region 250 is moved to different portions of the polymer layer 220 during stretching. In some cases, the first polymer layer 220 can thin down to essentially zero thickness, as shown, for example, at fifth thickness 275. Such variations in the thickness of first polymer layer 220 can be due to the materials used in the layer, and/or the process conditions during the stretch, such as, for example, the temperature or draw rate, as described elsewhere. In some cases, materials and process conditions can affect the variations in thickness but only in the way in which it affects the cracked coating, that is, if the cracked coating elongates somewhat, then it doesn't resist the draw force in the skin as much as an area where the cracked coating does not elongate. Phase size and thickness of the coating region can generally affect the movement and form of first polymer layer 220.

In FIG. 2C, the thickness of the third polymer layer 220' varies across the second major surface 205 of the stretched film, creating the second major surface 205 texture, similar to the first major surface 215 texture described previously for FIG. 2B. For example, a sixth thickness 272' under fourth region 240', may be different from a seventh thickness 274' under fifth region 250', and also different from an eighth thickness 276' under sixth region 260'. In some cases, at least two of the sixth, seventh and eighth thicknesses 272', 274', 276' may be essentially the same, or they may be different. The thickness of the third polymer layer 220' between adjacent regions decreases by the thinning down of this layer, and as such, a ninth thickness 273' and a tenth thickness 275' can be generally less than any of sixth, seventh and eighth thicknesses 272', 274', 276', respectively.

Figure 2D:
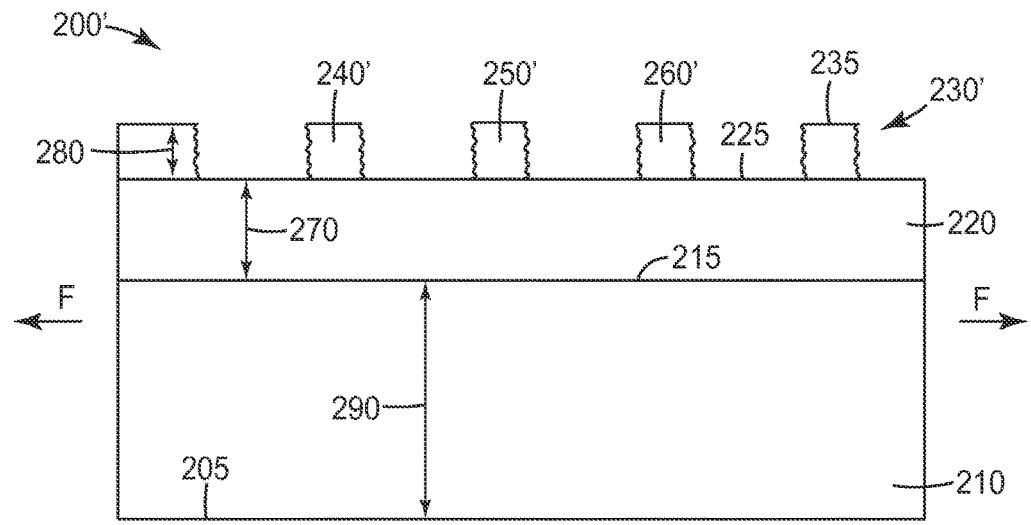
FIG. 2D is a cross-sectional schematic of a polymeric multilayer film.

FIG. 2D is a cross-sectional schematic of a polymeric multilayer film such as an optical film 200' according to one aspect of the disclosure. Optical film 200' includes a polymeric film 210 having a first major surface 215, a second major surface 205, and a first polymeric film thickness 290. Each of the elements 205-290 shown in FIG. 2D correspond to the materials description and properties of like-numbered elements 205-290 shown in FIG. 2A, which have been described previously. In one particular embodiment, polymeric film 210 is a multilayer optical film, as described elsewhere. A first polymer layer 220 (that is, a skin layer) is disposed on the first major surface 215 to a polymer layer thickness 270. A patterned second polymer layer 230' having a coated thickness 280 is disposed on the first polymer layer 220 and forms an interface 225 between the first polymer layer 220 and the patterned second polymer layer 230, and a free surface 235. A stretching force "F" is shown to be applied to the plane of the optical film 200'.

In one particular embodiment, each of the layers in optical film 200' is comprised of a material that responds in a different manner to applied stress resulting from the stretching force "F". In some cases, the polymeric film 210 is a polymer layer that strain hardens upon application of the stretching force "F", and as such, the first polymeric film thickness 290 uniformly decreases as the optical film 200' stretches. The first polymer layer 220 is a polymer layer that either does not strain harden (that is, remains essentially amorphous), or strain hardens to a lesser degree than polymeric film 210, or even only slightly, upon application of the stretching force "F", and as such, the first polymer layer thickness 270 non-uniformly decreases as the optical film 200' stretches. First polymer layer 220 typically "thins down" non-uniformly, a behavior of stretching a generally non-strain-hardenable polymer film that is well known in the art.

In one particular embodiment, a plurality of coating non-uniformities, can be formed in the second polymer layer 230' by patterning the second polymer layer 230' using at least one of several techniques including, for example, ink-jet printing, gravure printing, screen printing, spray coating, embossing, scribing, and the like. Generally, patterns may be formed randomly across the free surface 235 of the second polymer layer 230', or in a predetermined grid or array. In some cases, patterns may be imposed at desired positions by externally imparting some feature, for example, scratches, impressions, and the like, to the free surface 235 prior to stretching, such that second polymer layer 230' becomes a second polymer layer 230' having a non-uniform thickness. In one particular embodiment, FIG. 2D shows a first protrusion 240', a second protrusion 250', and a third protrusion 260', in the second polymer layer 230'. Protrusions can be distributed in any fashion across the surface of the second polymer layer 230'. In some cases, protrusions can form "islands" which can range in diameter from about a few hundreds of nanometers to about a few hundreds of microns. In some cases, protrusions can form "stripes" which can also range in width from about a few hundreds of nanometers to about a few hundreds of microns.

Figure 2E:
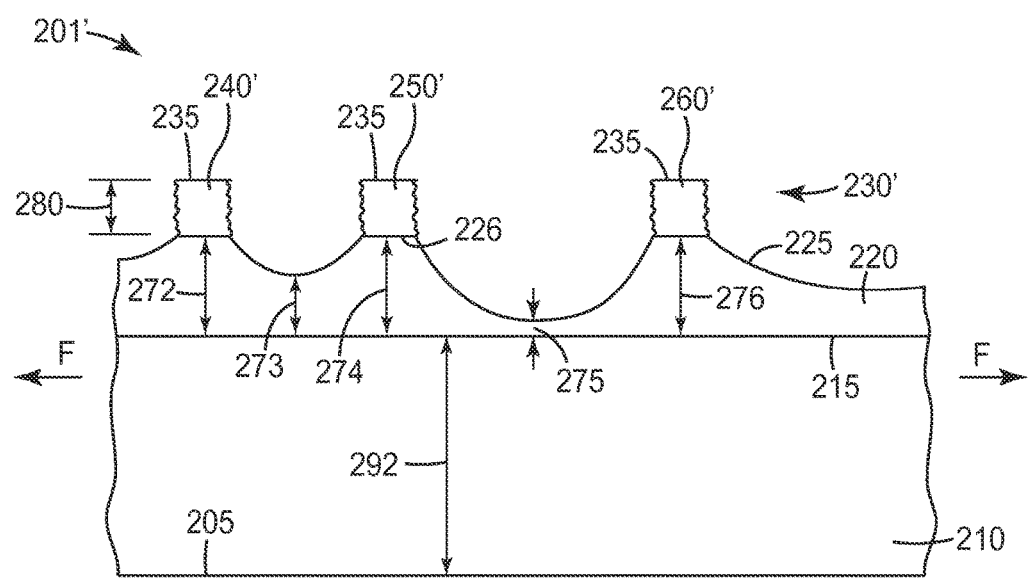
FIG. 2E is a cross-sectional schematic of a textured film.

FIG. 2E is a cross-sectional schematic of a polymeric multilayer film such as an optical film 201' according to one aspect of the disclosure. Optical film 201' can be a textured film 201' that includes a polymeric film 210 having a first major surface 215, a second major surface 205, and a first polymeric film thickness 292, as described elsewhere. Each of the elements 205-290 shown in FIG. 2D correspond to the materials description and properties of like-numbered elements 205-290 shown in FIG. 2A, which have been described previously. Each of the first protrusion 240', second protrusion 250', and third protrusion 260' have become further separated from each other after stretching the optical film 200' shown in FIG. 2D to the extent shown in FIG. 2E.

As the optical film 201' stretches, each of the film layers experiences forces that, due to the nature of the materials in each film layer, results in different changes to each layer, as described elsewhere, for example, with reference to FIG.

2B. The thickness of the first polymer layer 220 varies across the first major surface 215 of the stretched film, creating the first major surface 215 texture. For example, a first thickness 272 under first protrusion 240' may be different from a second thickness 274 under second protrusion 250', and also different from a third thickness 276 under third protrusion 260'. However, in some cases, at least two of the first, second and third thicknesses 272, 274, 276 may be essentially the same, or they may be different. The thickness of the first polymer layer 220 between adjacent protrusions decreases by the thinning down of this layer, and as such, a fourth thickness 273 and a fifth thickness 275 can be generally less than any of the first, second or third thicknesses 272, 274, 276, respectively. In one particular embodiment, the difference in thickness of the first polymer layer 220 across the first major surface 215 can be, for example, greater than about 0.1 microns, or greater than about 0.5 microns, or greater than about 1 micron, or greater than about 3 microns, or even greater than about 5 microns. In some cases, the difference in thickness of the first polymer layer 220 across the first major surface 215 can be essentially the coated thickness 270 of the first polymer layer 220 as shown in FIG. 2D, that is, the thickness can be reduced to near zero in some portions of the first polymer layer 220.

Figure 2F:
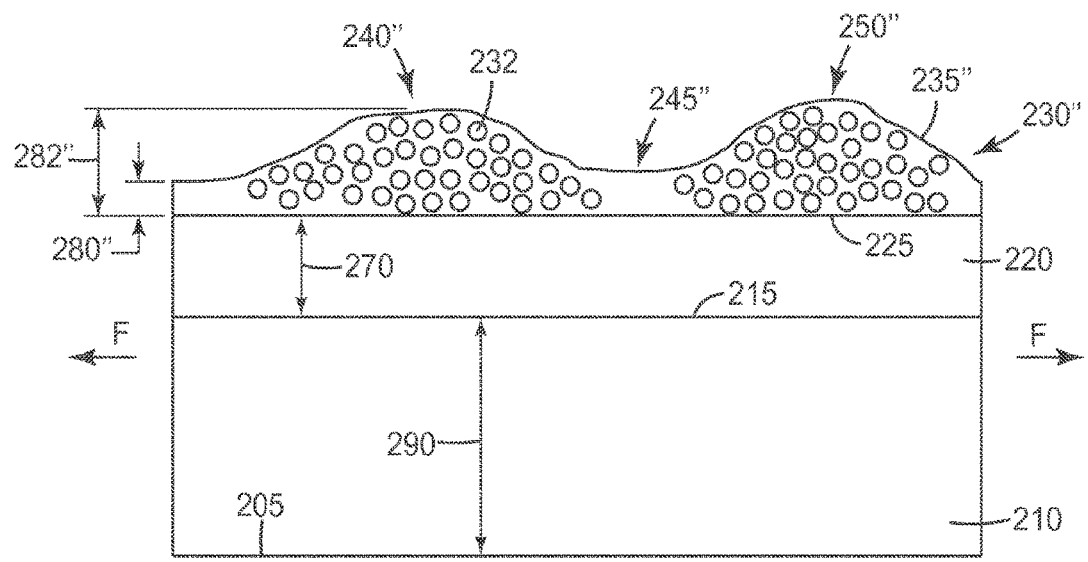
FIG. 2F is a cross-sectional schematic of a polymeric multilayer film.

FIG. 2F is a cross-sectional schematic of a polymeric multilayer film such as an optical film 200" according to one aspect of the disclosure. Optical film 200" includes a polymeric film 210 having a first major surface 215, a second major surface 205, and a first polymeric film thickness 290. Each of the elements 205-290 shown in FIG. 2F correspond to the materials description and properties of like-numbered elements 205-290 shown in FIG. 2A, which have been described previously. In one particular embodiment, polymeric film 210 is a multilayer optical film, as described elsewhere. A first polymer layer 220 (that is, a skin layer) is disposed on the first major surface 215 to a polymer layer thickness 270. A patterned second polymer layer 230" having a non-uniform coated thickness ranging from a thin region 280" to a thick region 282" is disposed on the first polymer layer 220 and forms an interface 225 between the first polymer layer 220 and the patterned second polymer layer 230", and a free surface 235. Patterned second polymer layer 230" can further include optional particles 232 that may be distributed uniformly or non-uniformly throughout the patterned second polymer layer 230". In one particular embodiment, optional particles 232 can be organic or inorganic beads that are distributed such that a major portion of the beads in the coating are agglomerated into the thick region 282" of patterned second polymer layer 230". A stretching force "F" is shown to be applied to the plane of the optical film 200".

In one particular embodiment, each of the layers in optical film 200" is comprised of a material that responds in a different manner to applied stress resulting from the stretching force "F". In some cases, the polymeric film 210 is a polymer layer that strain hardens upon application of the stretching force "F", and as such, the first polymeric film thickness 290 uniformly decreases as the optical film 200" stretches. The first polymer layer 220 is a polymer layer that either does not strain harden (that is, remains essentially amorphous), or strain hardens to a lesser degree than polymeric film 210, or even only slightly, upon application of the stretching force "F", and as such, the first polymer layer thickness 270 non-uniformly decreases as the optical film 200' stretches. First polymer layer 220 typically "thins down" non-uniformly, a behavior of stretching a generally non-strain-hardenable polymer film that is well known in the art.

In one particular embodiment, a plurality of coating non-uniformities, can be formed in the second polymer layer 230" by patterning the second polymer layer 230" using at least one of several techniques including, for example, ink-jet printing, gravure printing, screen printing, spray coating, embossing, scribing, and the like. Generally, patterns may be formed randomly across the free surface 235 of the second polymer layer 230", or in a predetermined grid or array. In some cases, patterns may be imposed at desired positions by agglomeration of particles 232 in the second polymer coating 230" as shown in FIG. 2F, such that second polymer layer 230' becomes a second polymer layer 230' having a non-uniform thickness. In one particular embodiment, FIG. 2F shows a first protrusion 240", a second protrusion 250", and a thin region 245" between them, in the second polymer layer 230". Protrusions can be distributed in any fashion across the surface of the second polymer layer 230". In some cases, protrusions can form "islands" which can range in diameter from about a few hundreds of nanometers to about a few hundreds of microns. In some cases, protrusions can form "stripes" which can also range in width from about a few hundreds of nanometers to about a few hundreds of microns.

Figure 2G:
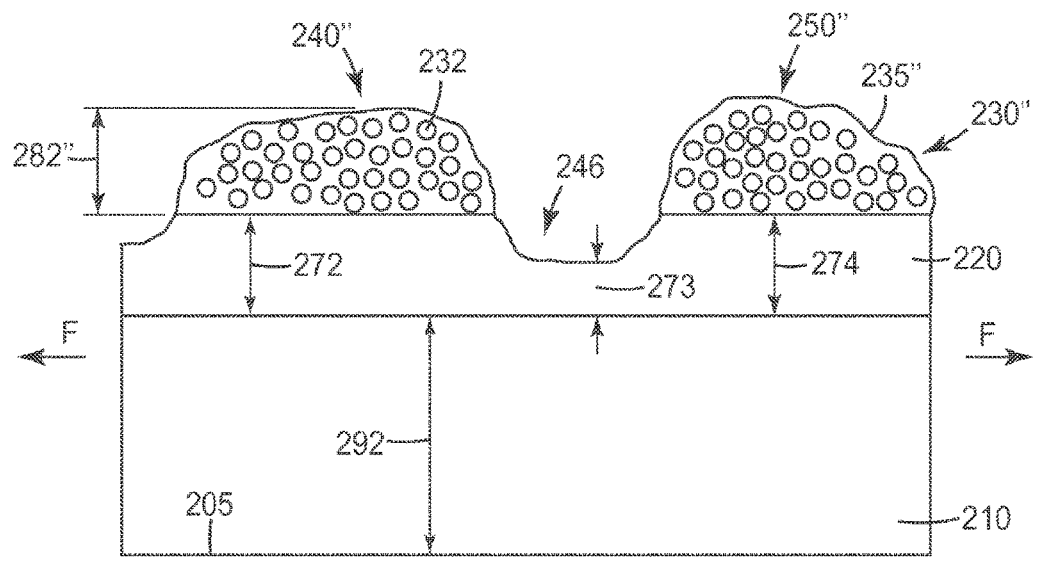
FIG. 2G is a cross-sectional schematic of a textured film.

FIG. 2G is a cross-sectional schematic of a polymeric multilayer film such as an optical film 201" according to one aspect of the disclosure. Optical film 201" can be a textured film 201" that includes a polymeric film 210 having a first major surface 215, a second major surface 205, and a first polymeric film thickness 292, as described elsewhere. Each of the elements 205-290 shown in FIG. 2G correspond to the materials description and properties of like-numbered elements 205-290 shown in FIG. 2A, which have been described previously. Each of the first protrusion 240" and second protrusion 250" have become further separated from each other after stretching the optical film 200" shown in FIG. 2F to the extent shown in FIG. 2G.

As the optical film 201" stretches, each of the film layers experiences forces that, due to the nature of the materials in each film layer, results in different changes to each layer, as described elsewhere, for example, with reference to FIG. 2B. The thickness of the first polymer layer 220 varies across the first major surface 215 of the stretched film, creating the first major surface 215 texture. For example, a first thickness 272 under first protrusion 240" may be different from a second thickness 274 under second protrusion 250". The thickness of the first polymer layer 220 between adjacent protrusions in neckdown region 246 decreases by the thinning down of this layer, and as such, a fourth thickness 273 can be generally less than any of the first or second thicknesses 272, 274, respectively. In some cases, the thin region 245" of optical film 200" can fracture such that second polymer layer 230" is absent in neckdown region 246. In some cases (not shown), the thin region 245" of optical film 200" can stretch along with first polymer layer 220, such that there is a thinned coating of the second polymer layer 230" between adjacent protrusions. In one particular embodiment, the difference in thickness of the first polymer layer 220 across the first major surface 215 can be, for example, greater than about 0.1 microns, or greater than about 0.5 microns, or greater than about 1 micron, or greater than about 3 microns, or even greater than about 5 microns. In some cases, the difference in thickness of the first polymer layer 220 across the first major surface 215 can be essentially the coated thickness 270 of the first polymer layer 220 as shown in FIG. 2F, that is, the thickness can be reduced to near zero in some portions of the first polymer layer 220.

Figure 3A:
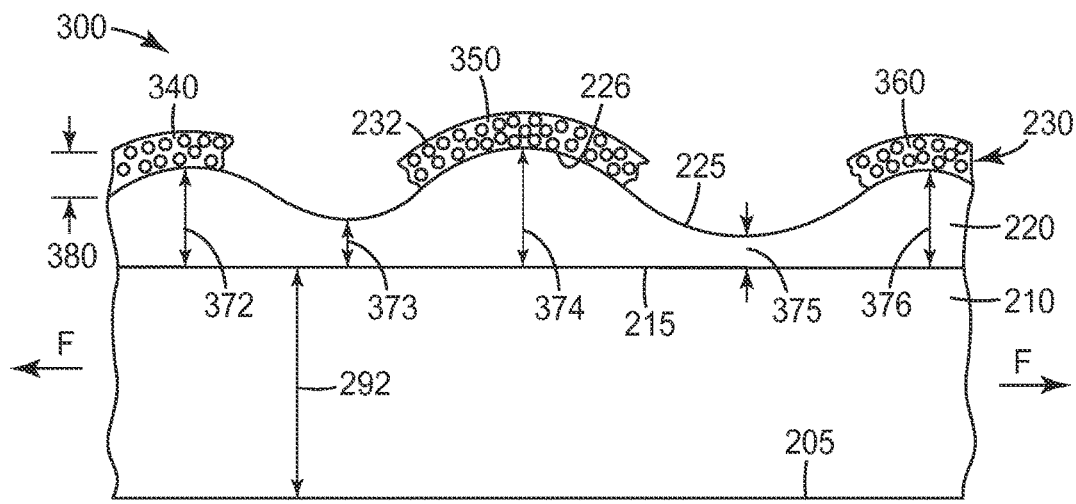
FIG. 3A is a cross-sectional schematic of a textured film.

FIG. 3A is a cross-sectional schematic of a polymeric multilayer film such as an optical film 300 according to one aspect of the disclosure. Optical film 300 can be a textured film 300 that includes a polymeric film 210 having a first major surface 215, a second major surface 205, and a first polymeric film thickness 290, as described elsewhere. As shown in FIG. 3A, a second polymer layer 230 can further include optional particles 232, such as organic or inorganic beads. Each of the elements 205-292 shown in FIG. 3A correspond to like-numbered elements 205-292 shown in FIG. 2B, which have been described previously. In FIG. 3A, the polymer layer 220 has a thickness that not only varies on the free surface 225 between a first, a second, and a third protrusions 340, 350, 360, but also varies on the adhered surface 226 below each of the regions. In some cases, a protrusion region thickness 380 remains essentially constant over the area of the region as shown in FIG. 3A.

Figure 3B:
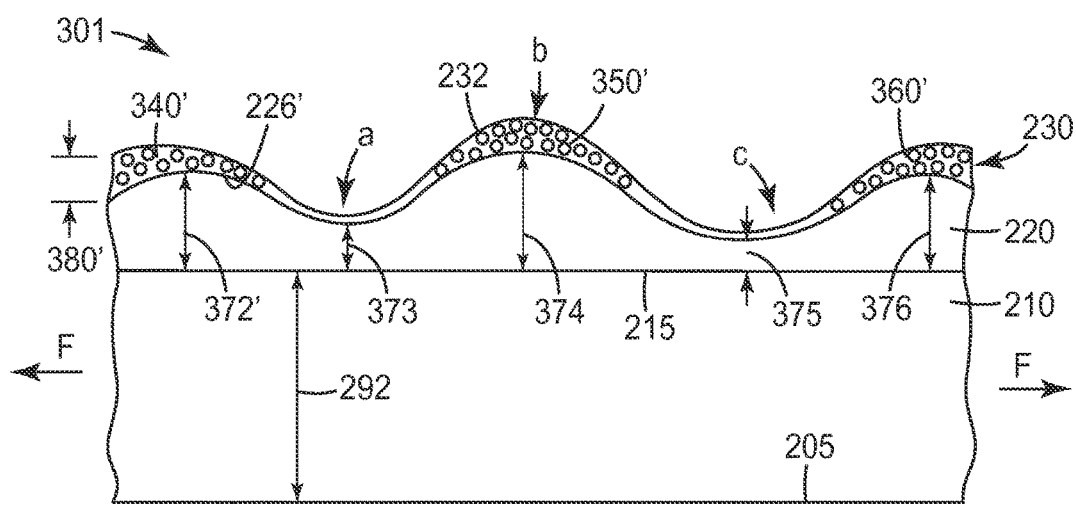
FIG. 3B is a cross-sectional schematic of a textured film.

In some cases, a second polymer layer thickness 380' can vary over the area of the protrusion region as shown in FIG. 3B, which shows a polymeric multilayer film such as an optical film 301 according to one aspect of the disclosure. As shown in FIG. 3B, a second polymer layer 230 can further include optional particles 232, such as organic or inorganic beads. Each of the elements 205-292 shown in FIG. 3A correspond to like-numbered elements 205-292 shown in FIG. 2B, which have been described previously. In FIG. 3B, for example, the protrusion region thickness 380' of second region 350' can be thinned at a first position "a" and a third position "c" relative to a second position "b". This variation in protrusion region thickness 380' can be due to, for example, the materials used in the layer, and/or the process conditions during the stretch, such as, for example, the temperature or draw rate, as described elsewhere.

In some cases, the stretch temperature can affect the brittleness of the coating, such that if the draw temperature profile during tentering were chosen such that the preheat differs from the stretch, the film could become hot enough above a softening point of the coating for a portion of the draw. In order to get proper orientation of the strain hardening layer, the temperature profile should preferably be balanced, that is, if the preheat of the web was hotter, then the stretch must be colder, as compared to a equal temperature profile between preheat and stretch zones.

In such a case where a crosslinking mechanism exists in the coating the brittleness, and therefore the appearance of the cracking, can be affected by the activation energy of the crosslinking chemistry, the nature and quantity of catalyst, amount of crosslinker, and other known mechanisms that can affect the onset of brittleness. In other cases, addition of materials that serve to plasticize or coalesce the coating can have an opposite or attenuating effect on the character of the surface. Coalescing agents are well known in the art, and can include materials such as Dowanol DPM or n-methylpyrrolidone.

Some of the benefits which can be realized by using the textured coatings according to the present disclosure include defect hiding, scratch resistance, and anti-wet out. Antistatic materials can also added to textured coatings and have shown to be effective. In some cases, multilayer optical films used in displays often require matte and/or high haze/low clarity to create uniform displays. It can be difficult to develop high haze/low clarity coatings which are visually acceptable and low cost. The textured coating and corresponding skin layer interactions described herein enable surface characteristics which can emulate costly post stretching coatings.

Several applications of multilayer optical films require lamination using a UV curable adhesive to secure layers of PET or PC to one or both sides of the MOF. The UV adhesives wet out the matte surface and should have no apparent effect on the end laminate use, thus these films can be used as a reduced cost "certified component" whereas the textured surface can be exposed (in the case of single side laminates) or can be encapsulated (in the case of dual side laminates), without the use of a premask layer to assist in winding. Other multilayer optical films can be stand alone thicker films which incorporate an immiscible blend to develop a matte surface. These blends can lead to some undesirable bulk scattering, can have limitations on cross web uniformity and/or levels of acceptable haze/clarity, and often can have surface characteristics which can wet out to other films in a display stack. A pre-stretching textured coating such as described herein may achieve higher haze and lower clarity than can be achieved with immiscible blends, while retaining desired optical characteristics and cross web uniformity.

New MOF designs can be created using the textured coatings of the present disclosure. In one particular embodiment, we have discovered that the thickness of the texturable coating can have a large impact on the amount of reinforcement of the skin and roughly the threshold of coating thickness required to impact the optical stack. In one particular embodiment, selection of the skin or texturable coating can result in a film where a reinforcing layer is laminated to one side of the film, wetting out the matte, and the other side can be used as a functional part of, for example, an LCD display. In some cases, once the texturable coating is thick enough, or the skins are thin enough, the optical stack can be impacted only on the outer most adjacent layers.

While an order is implied for the various stretching, or draw, processes, the order is not intended to be limiting. In certain instances the order of the processes can be changed or performed concurrently as long as subsequently performed processes do not adversely affect previously performed processes. For example, the material may be drawn in two directions at the same time. When the film is concurrently drawn along both in-plane axes the draw temperature will be the same for the materials in the film. The draw ratio and rate, however, may be separately controlled. For example, the film may be drawn relatively quickly in the first direction, for example, downweb, and relatively slowly in the second direction, that is, crossweb.

The materials, draw ratio and rate of the concurrent biaxial draw may be suitably selected such that a draw along a first draw axis (for example, the quick draw) is optically orienting for one or both materials along the first draw axis while the draw in the other direction (for example, the slow draw) is non-orienting (or non-optically orienting for one of the two materials along the second draw axis. Thus, it will be appreciated that the response of the two materials to the draw in each direction may be independently controlled. Using such a process, the optical characteristics (for example, x, y, or z-axis refractive indices matching of adjacent layers in a multilayer optical film) and/or the mechanical properties (e.g., resistance to tear or creasing, stiffness, or dimensional stability including but not limited to warpage, thermal and hygroscopic expansion and shrinkage) may be improved.

Many different materials may be used to fabricate the optical films in accordance with the present invention. The materials must generally be suitable for processing into the desired structure. For example, if a multilayer film is to be produced, two or more materials which can be formed into multiple layers must be chosen. If the multilayer structure is coextruded, then the materials selected must be coextrudable. The materials should be formable into a good cast web that can be drawn. Interlayer adhesion and post processability should also be considered in construction of a multilayer film. The material should also be free from any undesirable orientation prior to the draw processes. Alternatively, deliberate orientation can be induced during the casting step as a process aid to the first draw step. For example the casting step may be considered part of the first draw step. In another example, the casting step can be a nucleating step for crystallization that alters the relaxation characteristics of the second material for subsequent draw steps.

The materials used in the optical film must also exhibit the desirable optical properties (for example, birefringence) and must have different enough visco-elastic characteristics to permit proper selection of processing conditions for the desired result. In selecting materials consideration may be given to glass transition temperatures, crystallization and crosslinking behaviors, molecular weight averages and distributions, chemical compositions and structures and other optical properties (for example, refractive indices, dispersion, etc.).

EXAMPLES

The following list of materials and their source is referred to throughout the Examples. If not otherwise specified, materials are available from Aldrich Chemical, Milwaukee, Wis. Multilayer films were generally prepared according to methods described in, for example, U.S. Pat. No. 6,179,948 (Merrill et al); U.S. Pat. No. 6,827,886 (Neavin et al); 2006/0084780 (Hebrink et al); 2006/0226561 (Merrill et al.); and 2007/0047080 (Stover et al.).

| | |
|---|---|
| Carboset PC23 - acrylic copolymer emulsion | Lubrizol Co., Wickliffe, Ohio |
| Tomadol 25-9 surfactant | Air Products Co., Allentown, PA |
| 1100D - Hydro-Rez 1100D sulfopolyester resin dispersion | Hexion Specialty Chemicals, Columbus, OH |
| WB-50 sulfopolyester dispersion | Prepared as described below |
| CM323 - Cymel 323 crosslinker | CYTEC Industries Inc., West Paterson, NJ |
| CM327 - Cymel 327 crosslinker | CYTEC Industries Inc., West Paterson, NJ |
| Cycat 4045 - catalyst | CYTEC Industries Inc., West Paterson, NJ |
| MX-300 - 3 micron crosslinked acrylic beads | Soken Chemical and Engineering Co, Tokyo |
| PETg - Glycol modified Polyetheylene Terephthalate Copolymer (grades 6763 and GN071) | Eastman Chemical, Kingsport, TN |

Preparation of WB-50 Sulfopolyester Dispersion

WB-50 was prepared as follows (materials available from Aldrich Chemical, Milwaukee, Wis.). A one gallon polymerization kettle was charged with 111.9 g (5.5 mol %) 5-sodiosulfoisophthalic acid, 592.1 g (47.0 mol %) terephthalic acid, 598.4 g (47.5 mol %) isophthalic acid, 705.8 g ethylene glycol, 599 g neopentyl glycol, 0.7 g antimony oxide, and 2.5 g sodium acetate. The mixture was heated with stirring to 230° C. at 345 kPa (50 psi) under nitrogen for 2 hours, during which time water evolution was observed. The temperature was increased to 250 C and the pressure was then reduced, vacuum was applied (0.2 torr), and the temperature was increased to 270° C. The viscosity of the material increased over a period of 45 minutes, after which time a high molecular weight, clear, viscous sulfopolyester was drained. This sulfopolyester was found by DSC to have a Tg of 70.3° C. The theoretical sulfonate equivalent weight was 3847 g polymer per mole of sulfonate. 500 g of the polymer was dissolved in a mixture of 2000 g water and 450 g isopropanol at 80° C. The temperature was then raised to 95 C in order to remove the isopropanol (and a portion of the water). The final dispersion consisted of an aqueous 20 wt/wt % solids dispersion of WB-50.

Premix Dilutions

For the Examples below, the following premix dilutions were made. Tomadol 25-9 (100% solids as received) was diluted to 10 wt/wt % in water. Cycat 4045 (35% solids) was diluted to 10 wt/wt % in water.

Example 1

Beaded Diffuser Coating Composition "A" was prepared as follows. 1.7 grams CM327 was placed in a mixing container with magnetic stirring to which was added 34 grams of WB50. This was stirred for approximately 30 minutes and then the following was added in succession 1.5 grams Tomadol 25-9 premix, 0.313 grams Cycat 4045 premix, 9.4 grams of dry MX-300 beads, and 3.1 grams 1100D emulsion. This mixture was stirred for another 10 minutes followed by ultrasonic agitation for approximately 20 minutes.

Figure 4:
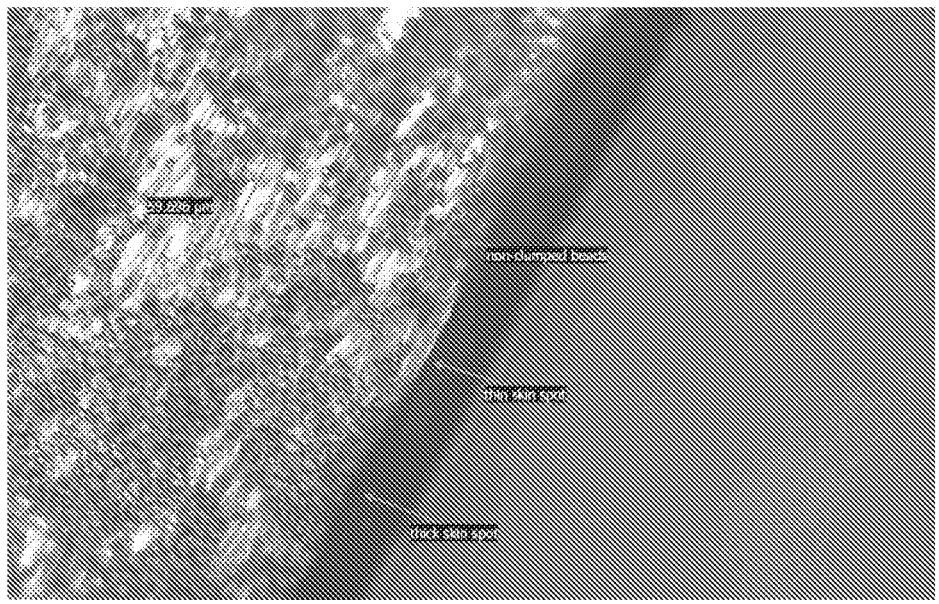
FIG. 4 is a top view photograph of a textured film.

Example 1 used an MOF cast web substrate having a skin layer of PETg about 18 microns thick. The commercially available PETg employed is believed to have an ethylene glycol to cyclohexanedimethanol ratio of approximately 7:3. The optical stack of 305 alternating polymer layers contained high-index layers made from a polyethylene naphthalate copolymer having 90% naphthalate moieties and 10% terephthalate moieties (90:10 coPEN); and low-index isotropic layers made from a blend of 45:55 (wt/wt) of 90:10 coPEN with PETg. This substrate was coated by hand with the Beaded Diffuser Coating Composition "A" using a #6 wire-wound rod on the substrate. The coated substrate was dried for 5 minutes at 66° C. (150° F.). The web was then placed into the oven of a batch film stretching instrument. The web was heated at an oven temperature of 115° C. and drawn (while constrained in the non-stretch direction, to simulate stretching in a conventional film tenter) at a draw rate of 50% per second. The machine was set to produce a nominal transverse draw ratio of 5.1:1; the actual draw ratio was determined to be 4.6:1. The resulting coating of the textured film was a polymer layer having protrusion regions with a high concentration of acrylic beads and having thin regions between the protrusion regions with low concentration of acrylic beads. A top view photograph of the textured film of Example 1 is shown in FIG. 4.

Example 2

Figure 5:
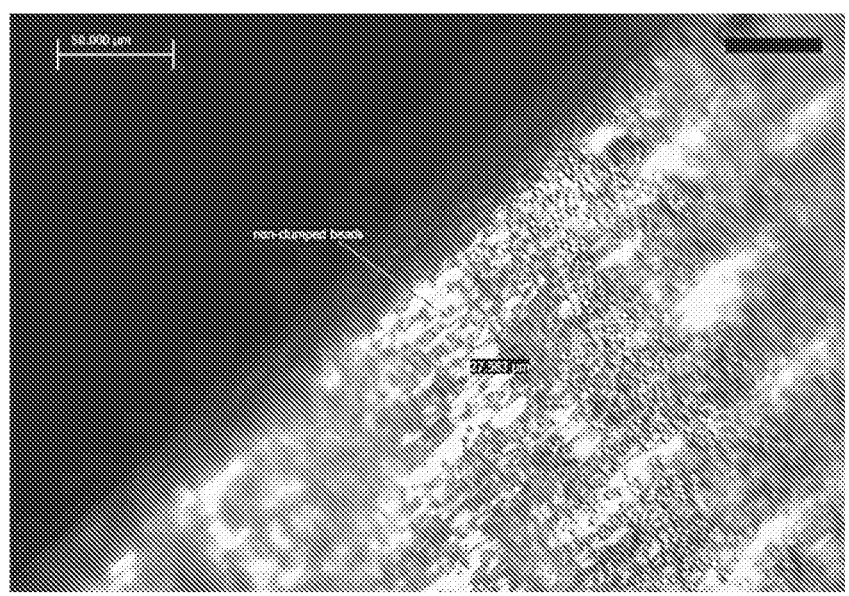
FIG. 5 is a top view photograph of a textured film.

Example 2 used an MOF cast web substrate as described in Example 1 except the skin layer of PETg was about 2 microns thick. This substrate was coated by hand with the Beaded Diffuser Coating Composition "A" using a #6 wire-wound rod on the substrate. The coated substrate was dried for 5 minutes at 66° C. (150° F.). The web was then placed into the oven of a batch film stretching instrument. The web was heated at an oven temperature of 115° C. and drawn (while constrained in the non-stretch direction, to simulate stretching in a conventional film tenter) at a draw rate of 50% per second. The machine was set to produce a nominal transverse draw ratio of 5.1:1. The resulting coating of the textured film was a polymer layer having protrusion regions with a high concentration of acrylic beads and having thin regions between the protrusion regions with low concentration of acrylic beads. A top view photograph of the textured film of Example 2 is shown in FIG. 5.

Example 3

Fracturable Coating Composition "B" was prepared as follows. 2.5 grams CM323 was placed in a mixing container with magnetic stirring to which was added 15.5 grams of PC23. This was stirred for approximately 30 minutes and then the following was added in succession 29.1 grams of water, 0.39 grams Cycat 4045 premix, 2.5 grams of dry MX-300 beads. This mixture was stirred for another 10 minutes followed by ultrasonic agitation for approximately 20 minutes.

Figure 6:
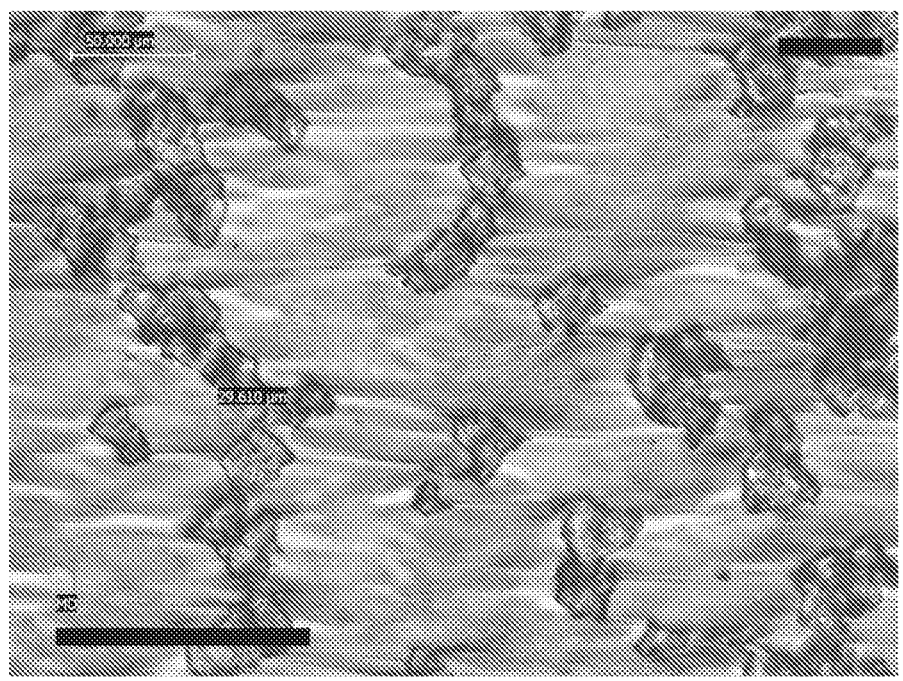
FIG. 6 is a top view photograph of a textured film.

Example 3 used an MOF cast web substrate as described in Example 1. This substrate was coated by hand with the Fracturable Coating Composition "B" using a #6 wire-wound rod on the substrate. The coated substrate was dried for 5 minutes at 66° C. (150° F.). The web was then placed into the oven of a batch film stretching instrument. The web was heated at an oven temperature of 115° C. and drawn (while constrained in the non-stretch direction, to simulate stretching in a conventional film tenter) at a draw rate of 50% per second. The machine was set to produce a nominal transverse draw ratio of 5.1:1; the actual draw ratio was determined to be 5.5:1. The resulting textured film had protrusions having a polymer coating containing acrylic beads and regions between the protrusions where the polymer coating was not present. A top view photograph of the textured film of Example 3 is shown in FIG. 6.

Following are a list of embodiments of the present disclosure.

Item 1 is a textured film, comprising: a strain-hardened polymeric film having a first major surface; a first polymer layer disposed on the first major surface; and a second polymer layer disposed on the first polymer layer, the second polymer layer comprising a plurality of protruding regions, each of the protruding regions having a protruding thickness greater than a coated thickness adjacent the protruding regions, wherein a portion of a first thickness of the first polymer layer adhered to each of the protruding regions is greater than a second thickness of the first polymer layer between at least one adjacent protruding region.

Item 2 is the textured film of item 1, wherein the first polymer layer comprises a material that strain hardens less than the strain-hardened polymer film.

Item 3 is the textured film of item 1 or item 2, wherein the first polymer layer comprises an amorphous polymer.

Item 4 is the textured film of item 1 to item 3, wherein the strain-hardened polymer film comprises a multilayer optical film.

Item 5 is the textured film of item 4, wherein the multilayer optical film comprises a dual brightness enhancing film (DBEF), an advanced polarizing film (APF), a color mirror film, or an enhanced specular reflective (ESR) film.

Item 6 is the textured film of item 1 to item 5, wherein the glass transition temperature (Tg) of the first polymer layer is less than the Tg of the strain-hardened polymer film.

Item 7 is the textured film of item 1 to item 6, wherein the first polymer layer comprises at least one polymer additive selected from antistats, ultraviolet absorbers, hindered amine light stabilizers, oligomeric polyesters, optical brighteners, or a combination thereof.

Item 8 is the textured film of item 7, wherein the at least one polymer additive is selected from a modified glycol, a di-acid, a di-ester, or a combination thereof.

Item 9 is the textured film of item 7, wherein the at least one polymer additive is selected from cyclohexanedimethanol (CHDM), neopentyl glycol (NPG), dimethyl 5-sodium-sulfoisophthalate (DMSSIP), dimethyl cyclohexyldicarboxylate (DMCD), hexanediol (HD), dimethyl isophthalate (DMI), or a combination thereof.

Item 10 is the textured film of item 1 to item 9, wherein the second polymer layer further comprises a plurality of particles.

Item 11 is the textured film of item 10, wherein a major portion of the plurality of particles are in the protruding regions.

Item 12 is the textured film of item 1 to item 11, wherein the second polymer layer comprises a continuous coating.

Item 13 is the textured film of item 1 to item 12, wherein the second polymer layer comprises a discontinuous coating.

Item 14 is a method of texturing a film, comprising: providing a multilayer film comprising a polymer film and a first polymer layer disposed on a first major surface of the polymer film; disposing a second polymer layer having a non-uniform thickness on the first polymer layer, opposite the polymer film; and stretching the multilayer film to form a plurality of protruding regions, each of the protruding regions adhered to the polymer layer, wherein a portion of a first thickness of the polymer layer adhered to each of the protruding regions is greater than a second thickness of the polymer layer between at least one adjacent protruding region.

Item 15 is the method of item 14, wherein stretching the multilayer film is done at a temperature between the glass transition temperature (Tg) and the melting temperature (Tm) of the polymer film.

Item 16 is the method of item 15, wherein the temperature is greater than Tg of the first polymer layer, and less than Tg of the second polymer layer.

Item 17 is the method of item 14 to item 16, wherein the polymer film comprises a strain-hardening polymer film.

Item 18 is the method of item 14 to item 17, wherein the first polymer layer does not substantially strain-harden.

Item 19 is the method of item 14 to item 18, wherein the first polymer layer has less strain hardening than the polymer film.

Item 20 is the method of item 17 to item 19, wherein the strain-hardening polymer film comprises a multilayer optical film.

Item 21 is the method of item 14 to item 20, wherein the second polymer layer comprises a plurality of particles.

Item 22 is the method of item 14 to item 21, wherein disposing the second polymer layer comprises solution coating.

Item 23 is the method of item 14 to item 22, wherein disposing the second polymer layer comprises pattern coating.

Item 24 is the method of item 23, wherein pattern coating comprises gravure printing, ink-jet printing, or spray coating.

Item 25 is the method of item 14 to item 24, wherein disposing a second polymer layer having a non-uniform thickness comprises coating a second polymer layer having a uniform thickness and embossing or scribing the second polymer layer to form a non-uniform thickness.

Item 26 is the method of item 14 to item 25, wherein stretching comprises stretching in a first direction, or stretching in a second direction perpendicular to the first direction, or stretching in a combination of the first direction and the second direction.

Item 27 is the method of item 26, wherein stretching in the first direction and stretching in the second direction occur essentially simultaneously.

Item 28 is the method of item 26, wherein stretching in the first direction and stretching in the second direction occur sequentially.

Item 29 is the method of item 26, wherein the first direction is downweb and the second direction is crossweb.

Item 30 is the method of claim 27, wherein stretching comprises a true uniaxial stretching.

Item 31 is a light management film stack comprising the textured film of item 1 to item 13.

Item 32 is a backlight comprising the textured film of item 1 to item 13.

Item 33 is a display comprising the textured film of item 1 to item 13.

The embodiments described can be used anywhere that a textured film can be used, for example, to aid in winding or stacking of polymeric films, or for control of optical properties of haze and clarity. The embodiments described can be applied anywhere that thin, optically transmissive structures are used, including light management films or light management film stacks; backlights including hollow and solid backlights; displays such as TV, notebook computers, computer monitors; and also as used for advertising, information display or lighting. The present disclosure is also applicable to electronic devices including laptop computers and handheld devices such as Personal Data Assistants (PDAs), personal gaming devices, cellphones, personal media players, handheld computers and the like, which incorporate optical displays. Backlights using textured films of the present disclosure have application in many other areas. For example, backlit LCD systems, luminaires, task lights, light sources, signs and point of purchase displays can be made using the described embodiments.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of texturing a film, comprising:
   providing a multilayer film comprising a polymer film and a first polymer layer disposed on a first major surface of the polymer film;
   disposing a second polymer layer having a non-uniform thickness on the first polymer layer, opposite the polymer film; and
   stretching the multilayer film to form a plurality of protruding regions, each of the protruding regions adhered to the first polymer layer,
   wherein a portion of a first thickness of the first polymer layer adhered to each of the protruding regions is greater than a second thickness of the first polymer layer between at least one adjacent protruding region,
   wherein the first polymer layer has less strain hardening than the polymer film, and
   wherein the second polymer layer is continuous between the protruding regions.

2. The method of claim 1, wherein stretching the multilayer film is done at a temperature between the glass transition temperature (Tg) and the melting temperature (Tm) of the polymer film.

3. The method of claim 2, wherein the temperature is greater than Tg of the first polymer layer, and less than Tg of the second polymer layer.

4. The method of claim 1, wherein the polymer film comprises a strain-hardening polymer film.

5. The method of claim 1, wherein the first polymer layer does not substantially strain-harden.

6. The method of claim 4, wherein the strain-hardening polymer film comprises a multilayer optical film.

7. The method of claim 1, wherein the second polymer layer comprises a plurality of particles in a coating.

8. The method of claim 1, wherein disposing the second polymer layer comprises solution coating.

9. The method of claim 1, wherein disposing the second polymer layer comprises pattern coating.

10. The method of claim 9, wherein pattern coating comprises gravure printing, ink-jet printing, or spray coating.

11. The method of claim 1, wherein disposing the second polymer layer having the non-uniform thickness comprises coating the second polymer layer having a uniform thickness and embossing or scribing the second polymer layer to form the non-uniform thickness.

12. The method of claim 1, wherein stretching comprises stretching in a first direction, or stretching in a second direction perpendicular to the first direction, or stretching in a combination of the first direction and the second direction.

13. The method of claim 12, wherein stretching in the first direction and stretching in the second direction occur simultaneously.

14. The method of claim 12, wherein stretching in the first direction and stretching in the second direction occur essentially sequentially.

15. The method of claim 12, wherein the first direction is downweb and the second direction is crossweb.

16. The method of claim 13, wherein stretching comprises a true uniaxial stretching.

* * * * *

UNITED STATES PATENT AND TRADEMARK OFFICE
CERTIFICATE OF CORRECTION

PATENT NO. : 9,895,837 B2
APPLICATION NO. : 14/342566
DATED : February 20, 2018
INVENTOR(S) : Kristopher Derks et al.

Page 1 of 1

It is certified that error appears in the above-identified patent and that said Letters Patent is hereby corrected as shown below:

On the Title Page

Item [75], Inventors, first line, delete "MA" and insert in place thereof -- MN --.

In the Specification

<u>Column 8,</u>
Line 1, delete the second instance of "of the".

<u>Column 9,</u>
Line 7, delete "5-sodiumsulfoisophthalate" and insert in place thereof
-- 5-sodium sulfoisophthalate --.
Line 8, delete "5-sodiumsulfoisophthalate" and insert in place thereof
-- 5-sodium sulfoisophthalate --.

<u>Column 17,</u>
Line 54, delete "polyetheylene" and insert in place thereof -- polyethylene --.

<u>Column 18,</u>
Line 3, delete "250 C" and insert in place thereof -- 250°C --.
Line 13, delete "95 C" and insert in place thereof -- 95°C --.

<u>Column 20,</u>
Lines 14-15, delete "5-sodiumsulfoisophthalate" and insert in place thereof
-- 5-sodium sulfoisophthalate --.

Signed and Sealed this
Second Day of October, 2018

Andrei Iancu
*Director of the United States Patent and Trademark Office*